ELECTRONIC SYSTEM FOR INDICATING MINUTE PARAMETER CHANGES

Filed June 28, 1954

INVENTORS
LOUIS J. ROGERS
CHARLES W. CAPEHART
RAYMOND B. FERTIG
BY
William J. Mesinger
ATTORNEY United States Patent Office 2,831,166
Patented Apr. 15, 1958

2,831,166

ELECTRONIC SYSTEM FOR INDICATING MINUTE PARAMETER CHANGES

Louis J. Rogers, Dunbar, Charles W. Capehart, Charleston, and Raymond B. Fertig, St. Albans, W. Va., assignors to Union Carbide Corporation, a corporation of New York Application June 28, 1954, Serial No. 439,626

9 Claims. (Cl. 332—2)

The present invention relates to electronic circuitry and, more particularly, to an electronic system for indicating minute circuit tuning changes caused by phenomena such as pressure, vacuum, temperature, physical displacement, and the like.

It is an object of the present invention to provide a simple, highly sensitive and efficient electronic system, capable of indicating minute changes caused by physical phenomena.

Another object is to provide such an electronic system capable of indicating changes caused by physical phenomena at a point remote therefrom.

A further object is to provide such an electronic system which will develop an output signal easily capable of being calibrated to indicate the minute change caused by said phenomena.

Other aims and advantages of the invention will be apparent from the following description and appended claims.

Figure 1:
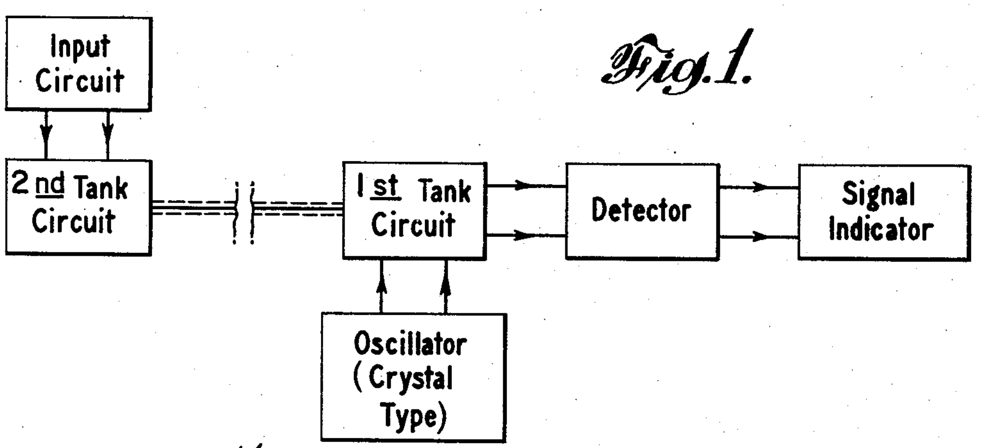
Fig. 1 is a schematic view of the electronic indicating system of the invention.
Figures 2, 3:
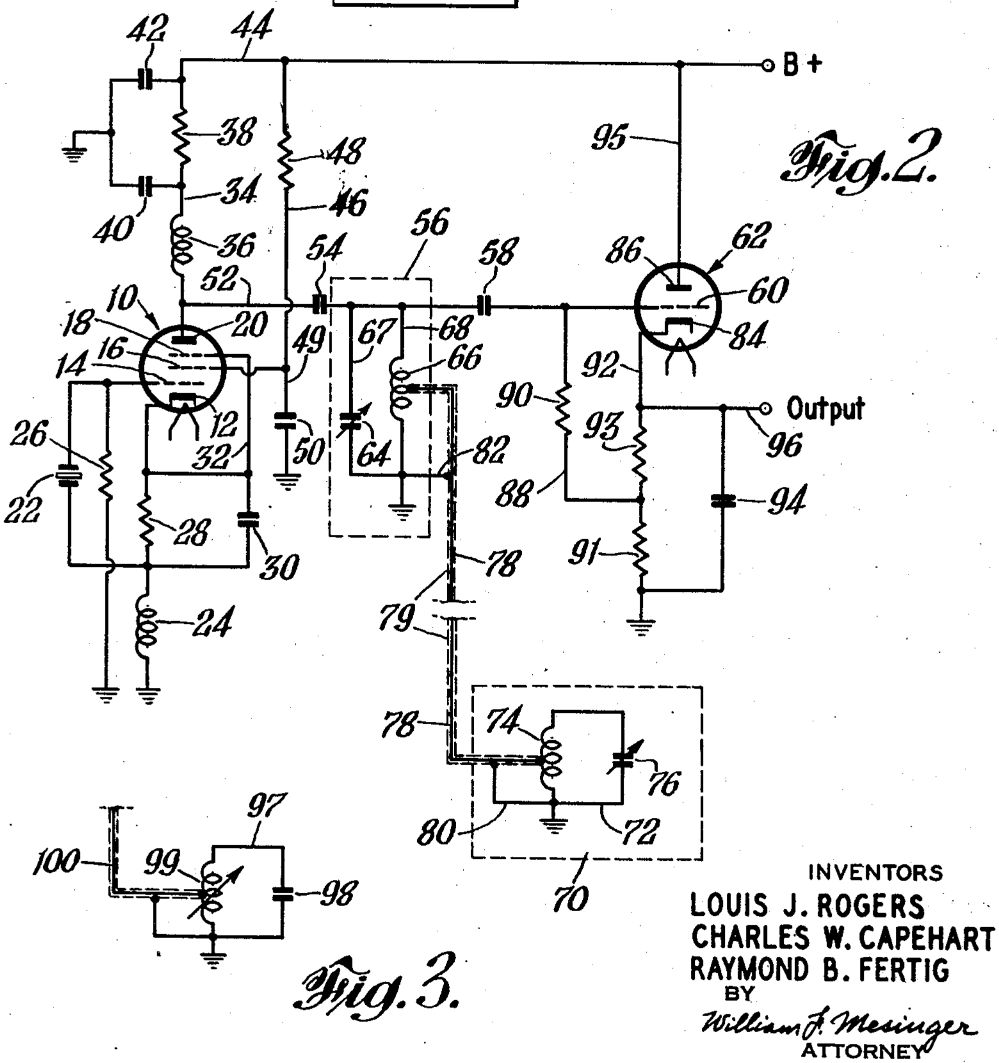
Fig. 2 is an electric circuit diagram of a system embodying the invention and employing a remote transducer head containing a variable capacitive element.
Fig. 3 is a circuit diagram of an alternative transducer head, containing a variable inductive element, which may be employed in the circuit of Fig. 2 in place of the transducer there shown.

In accordance with the invention, a system is provided for developing an electric output signal proportional to minute circuit tuning changes caused by physical phenomena. The system as shown schematically in Fig. 1, develops, at a point remote from the input circuit, a greatly amplified output signal. Referring more specifically to Fig. 2 of the drawing, an electron-coupled oscillator circuit is provided comprising a multi-element electron tube 10 having a cathode 12, a control grid 14, a screen grid 16, a suppresor grid 18 and a plate 20. The oscillator circuit is completed through cathode 12, control grid 14 and screen grid 16 of tube 10. A crystal 22 is employed in the control grid circuit and is in series with a radio frequency choke 24 to ground. In parallel with this combination is a grid resistor 26 to ground. The cathode circuit comprises a series combination of resistor 28 and condenser 30, in parallel with resistor 28. Suppressor grid 18 is maintained at cathode potential through line 32. Electronically coupled to the oscillator circuit through tube 10 are components externally connected to the screen grid 16 and plate 20 of tube 10. Plate circuit 34 comprises a series combination of radio frequency choke 36 and resistor 38. Condensers 40 and 42 by-pass resistor 38 and choke 36, respectively, to ground. The high potential side of resistor 38 is connected through line 44 to a source B+ of positive battery voltage. The screen grid circuit comprises line 46, to a positive battery voltage line 44, containing resistor 48, and line 49, containing condenser 50, to ground.

The output of the electron-coupled oscillator is taken off the plate 20 through line 52, containing coupling condenser 54, tank circuit 56, coupling condenser 58, and leads to the control grid 60 of electron tube 62 of a detector circuit.

The output voltage of the electron-coupled oscillator circuit contains fundamental and harmonic frequency components and this voltage appears across tank circuit 56 from line 52 to ground. All frequency components not shorted to ground through the tank circuit are applied to the control grid 60 of tube 62 of the detector circuit.

The tank circuit comprises the parallel connection of variable condenser 64 and inductor 66, in lines 67 and 68, respectively, with parameters so chosen and adjusted to provide resonant tuning at a frequency corresponding to either the fundamental or a harmonic of the oscillator frequency.

It has been found, however, that when this circuit is tuned to resonance at a higher harmonic of the crystal frequency, a many-fold increase in sensitivity of the overall system is realized.

A remotely-positioned transducer head circuit 70 is provided containing a tunable tank circuit 72 comprising a parallel-connected inductor 74 and variable condenser 76. The parameters of this tank circuit 72 are chosen so as to resonate at slightly off the same frequency as tank circuit 56. Variable condenser 76 is incorporated as a condenser microphone or the like, in an apparatus capable of translating such phenomena as pressure change, thermal expansion, physical displacement, and the like, into a change in the capacitance of condenser 76 and a corresponding detuning of tank circuit 72.

Tank circuit 72 is link-coupled to tank circuit 56 through transmission line 78 which joins points of corresponding impedance levels of inductors 74 and 66, thereby substantially matching these impedances. Sheath 79 of transmission line 78 is grounded for shielding purposes through lines 80 and 82. Accordingly, any tuning change in tank circuit 72 of the remote transducer head 70 accomplishes a tuning change in tank circuit 56 and changes that portion of the harmonic output voltage of the electron-coupled oscillator circuit which is allowed to reach the input grid 60 of the detector circuit.

It has been found that the two coupled tank circuits are electrically equivalent to a third tank circuit which has lumped parameters such as to operate at slightly off resonance at the harmonic frequency. This is so because, if the lumped parameters were chosen to operate at resonance, the slope of the curve of tank voltage vs. tank variable tuning would be zero and for both an increase and decrease in tank reactance the tank voltage would decrease thereby giving an output insensitive to direction of tuning change. However, by operating at above or below the resonant frequency, the voltage across the tank circuit will be sensitive to the direction of tuning change. It has been found that the parameters of the tank circuits may be selected for operation at any off resonant operation point between about resonance and the half voltage points of the tank voltage—tank reactance curve.

The detector circuit containing electron tube 62, having control grid 60, cathode 84, and plate 86, is of the triode detector type. The grid circuit 88 contains a series combination of resistors 90 and 91 to ground. The cathode circuit 92 contains a series combination of resistors 93 and 91 to ground. Cathode by-pass condenser 94 is in parallel with the series combination of resistors 93 and 91. The plate 86 is connected directly through line 95 to source B+ of positive battery voltage. The demodulated output of the system is developed at the cathode of the tube 62 and is taken off through line 96.

It has been found that in place of the tank circuit 72 shown in Fig. 2 of the drawing, containing a variable condenser 76, it is also possible to employ a tank circuit such as that shown in Fig. 3 of the drawing and attain substantially the same results. As there shown, the tank circuit 97 comprises a fixed capacitor 98 in parallel with a variable inductor 99. Shielded cable 100 is employed in a manner similar to cable 78 of Fig. 2 to link-couple the tank circuit of the remote transducer head to the tank circuit positioned between the electron-coupled oscillator and the detector. In this manner, minute tuning changes in the variable inductor, caused by the physical phenomenon to be measured, serve to detune the tank circuit 97 in essentially the same manner that the tuning changes variable condenser 76 caused detuning of the tank circuit 72 in the remote transducer head circuit of Fig. 1.

In operation, the output of the electron-coupled oscillator, having components at the fundamental and harmonic frequencies, is impressed across tank circuit 56 which is tuned to off resonance in combination with tank circuit 72, at either the fundamental, or preferably a higher harmonic frequency. Thus, with tank circuit 72 tuned off resonance at the third harmonic, for example, the fundamental and all other harmonic voltage components will be short circuited to ground through tank 56 and impedance will be offered by the tank circuit 56 only to the third harmonic voltage component. Accordingly, only the third harmonic voltage component, modulated due to the effect of tuning changes in the condenser 76 of tank circuit 72, or the tuning changes in the inductor 99 of tank circuit 97, will be fed to the input control grid 60 of the detector circuit. After demodulation, the voltage output of the system appearing from output line 96 to ground, will consist of the modulating voltage wave and will represent tuning changes in the capacitance of condenser 76 or inductor 99. This output voltage can be calibrated to indicated changes in the physical characteristic which caused the tuning changes, i. e., changes in pressure, temperature, physical displacement, and the like.

It has been found that by employing a crystal oscillator, such as in Fig. 2 in the drawing, a high degree of frequency stability is realized in the system. Additionally, a relatively high power output with high frequency stability is achieved in the system of the invention by employing an electron-coupled oscillator circuit. Circuit stability is further enhanced by the isolation of the change in tuning from the radio frequency energy driving source (the crystal oscillator) by means of the electron-coupled arrangement. In this manner, a change in tuning of the tank circuit 56 affects the crystal oscillator but little, but the link-coupling arangement between the two tank circuits allows a remotely-located sensing unit to react upon the control circuit as though it were a part of it and not remote from it. The link-coupling arrangement, being insensitive to tuning changes per se, provides a trouble-free and noise-free means of connecting the remotely-linked, highly sensitive circuit to the main body of the electronic system with little or no loss in sensitivity or increase in noise.

The detector 62 is preferably of the "infinite impedance" type and accordingly does not destroy the sensitivity of the measurement due to loading effects.

It has been found that the tuning response curve of the system is such as to give a very linear output voltage as a function of tuning, which may be of either the modulated or static variety. The sensitivity of measurement, of capacities for example, is the order of $10^{-17}$ farads in modulated systems or $10^{-14}$ farads in non-modulated systems, with a conversion efficiency in the order of 250 volts per micromicrofarad of change in a sensing element of 50 micromicrofarad total capacity. Sensitivities in the same orders of magnitude have been found where inductances have been employed as the tuning element.

What is claimed is:

1. An electronic system for developing an electrical output signal proportional to minute circuit tuning changes caused by physical phenomena comprising, an electron-coupled oscillator having output terminals; a detector circuit having input terminals electrically connected to said output terminals of said electron-coupled oscillator; a first tank circuit tuned to resonate at a frequency a selected component frequency of said electron-coupled oscillator output and connected across said output terminals of said electron-coupled oscillator; a second tank circuit remotely positioned from said tank circuit and tuned to resonate at a frequency slightly off the selected component resonant frequency of said first tank circuit, a parameter of said second tank circuit being variable and responsive to a changing physical phenomenon; and transmission line means communicating between the inductors of said first and second tank circuits to electrically link-couple the reactors thereof whereby amplitude modulation of said selected frequency component is obtained at the input of the detector circuit.

2. An electronic system in accordance with claim 1 wherein said variable parameter of said second tank circuit is a variable condenser.

3. An electronic system in accordance with claim 1 wherein said variable parameter of said second tank circuit is a variable inductor.

4. An electronic system for developing an electrical output signal proportional to minute circuit tuning changes caused by physical phenomena comprising, an electron-coupled oscillator having output terminals, a detector circuit having input terminals electrically connected to said output terminals of said electron-coupled oscillator; a first tank circuit connected across said output terminals of said electron-coupled oscillator; a second tank circuit remotely positioned from said first tank circuit and link-coupled to said first tank circuit through a transmission line, a parameter of said second tank circuit being variable and responsive to a changing physical phenomenon; said first tank circuit and link-coupled second tank circuit having parameters selected to form a lumped circuit tuned to resonate at a frequency slightly off a selected component frequency of the output of said electron-coupled oscillator whereby amplitude modulation of said selected frequency component is obtained at the input of the detector circuit.

5. An electronic system in accordance with claim 4 wherein said variable parameter of said second tank circuit is a variable condenser.

6. An electronic system in accordance with claim 4 wherein said variable parameter of said second tank circuit is a variable inductor.

7. An electronic system for developing an electrical output signal proportional to minute circuit tuning changes caused by physical phenomena comprising, an electron-coupled oscillator having output terminals, a detector circuit having input terminals electrically connected to said output terminals of said electron-coupled oscillator; a first tank circuit connected across said output terminals of said electron-coupled oscillator; a second tank circuit remotely positioned from said first tank circuit and electrically coupled to said first tank circuit at points of equal impedance levels of said respective tank circuits, a parameter of said second tank circuit being variable and responsive to changing physical phenomenon; said first tank circuit and link-coupled second tank circuit having parameters selected to form a lumped circuit tuned to resonate at a frequency slightly off a selected frequency component of the output of said electron-coupled oscillator whereby amplitude modulation of said selected frequency component is obtained at the input of the detector circuit.

8. An electronic system in accordance with claim 7 wherein said variable parameter of said second tank circuit is a variable condenser.

9. An electronic system in accordance with claim 7 wherein said variable parameter of said second tank circuit is a variable inductor.

References Cited in the file of this patent

UNITED STATES PATENTS

| | | |
|---|---|---|
| 2,371,373 | Badmaieff | Mar. 13, 1945 |
| 2,372,701 | Anatalek | Apr. 3, 1945 |
| 2,615,960 | Erwin | Oct. 28, 1952 |
| 2,671,202 | Petroff | Mar. 2, 1954 |

U. S. DEPARTMENT OF COMMERCE

PATENT OFFICE

CERTIFICATE OF CORRECTION

Patent No. 2,831,166

April 15, 1958

Louis J. Rogers et al.

It is hereby certified that error appears in the printed specification of the above numbered patent requiring correction and that the said Letters Patent should read as corrected below.

Column 4, line 12, strike out "frequency a"; line 15, after "said" insert --first--.

Signed and sealed this 27th day of May 1958.

(SEAL)
Attest:
KARL H. AXLINE

Attesting Officer

ROBERT C. WATSON
Commissioner of Patents